United States Patent [19]

Elabd

[11] Patent Number: 5,754,229
[45] Date of Patent: May 19, 1998

[54] ELECTRONIC IMAGE SENSOR WITH MULTIPLE, SEQUENTIAL OR STAGGERED EXPOSURE CAPABILITY FOR COLOR SNAP SHOT CAMERAS AND OTHER HIGH SPEED APPLICATIONS

[75] Inventor: Hammam Elabd, Sunnyvale, Calif.

[73] Assignee: Lockheed Martin Corporation, Milpitas, Calif.

[21] Appl. No.: 557,652

[22] Filed: Nov. 14, 1995

[51] Int. Cl.$^6$ .............. H04N 9/083; H04N 5/335; H04N 3/14

[52] U.S. Cl. .............. 348/319; 348/270; 348/282; 348/317; 348/320

[58] Field of Search ............... 348/266, 268, 348/269, 270, 272, 273, 276, 277, 280, 282, 283, 294, 311, 312, 315, 316, 317, 319–324, 630, 631, 645, 646; H04N 9/07, 9/04, 9/083, 5/335, 3/14

[56] References Cited

U.S. PATENT DOCUMENTS

| | | | |
|---|---|---|---|
| 3,777,061 | 12/1973 | Takemura | 178/5.4 R |
| 4,447,735 | 5/1984 | Horii | 250/578 |
| 4,528,594 | 7/1985 | Kadekodi et al. | 358/213 |
| 4,541,010 | 9/1985 | Alston | 358/44 |
| 4,598,321 | 7/1986 | Elabd et al. | 358/213 |
| 4,731,656 | 3/1988 | Dischert et al. | 358/213.25 |
| 4,821,103 | 4/1989 | Busby | 358/213.26 |
| 4,831,453 | 5/1989 | Takemura | 358/213.19 |
| 4,924,316 | 5/1990 | Kobayashi et al. | 358/213.26 |
| 4,989,075 | 1/1991 | Ito | 358/41 |
| 5,194,724 | 3/1993 | Sekine | 250/208.1 |
| 5,355,165 | 10/1994 | Kosonocky et al. | 348/311 |
| 5,406,331 | 4/1995 | Barrett | 348/268 |
| 5,497,195 | 3/1996 | Sayag | 348/266 |
| 5,521,639 | 5/1996 | Tomura et al. | 348/243 |
| 5,585,847 | 12/1996 | Sayag | 348/266 |

Primary Examiner—Andrew Faile
Assistant Examiner—Ngoc-Yen Vu
Attorney, Agent, or Firm—Perman & Green, LLP

[57] ABSTRACT

An image sensor device capable of snap shot color applications comprising an array of image registers for converting the light from successive image frame exposures into indicative charge packets, and an array of light-shielded storage registers interspersed in regular displacements among the array of image registers for receiving the transfer of the charge packets from adjacent image registers over multiple image frame exposures, whereby, for example, red, green, and blue color image frames can be rapidly acquired upon the opening of a flash exposure shutter, and very rapidly transferred in parallel into the storage registers from which the three frames can be read out as a color image when the shutter is closed.

19 Claims, 7 Drawing Sheets

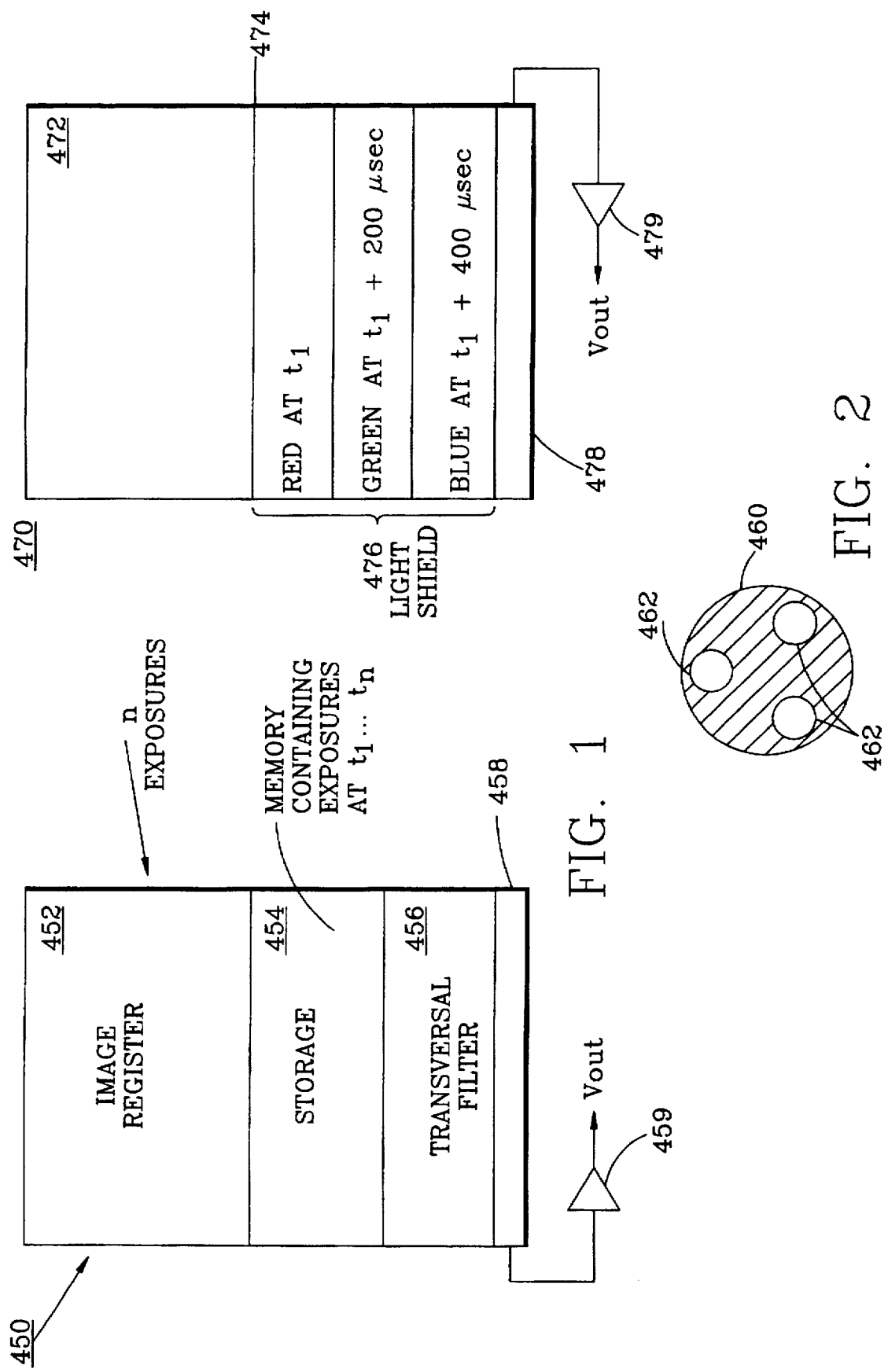

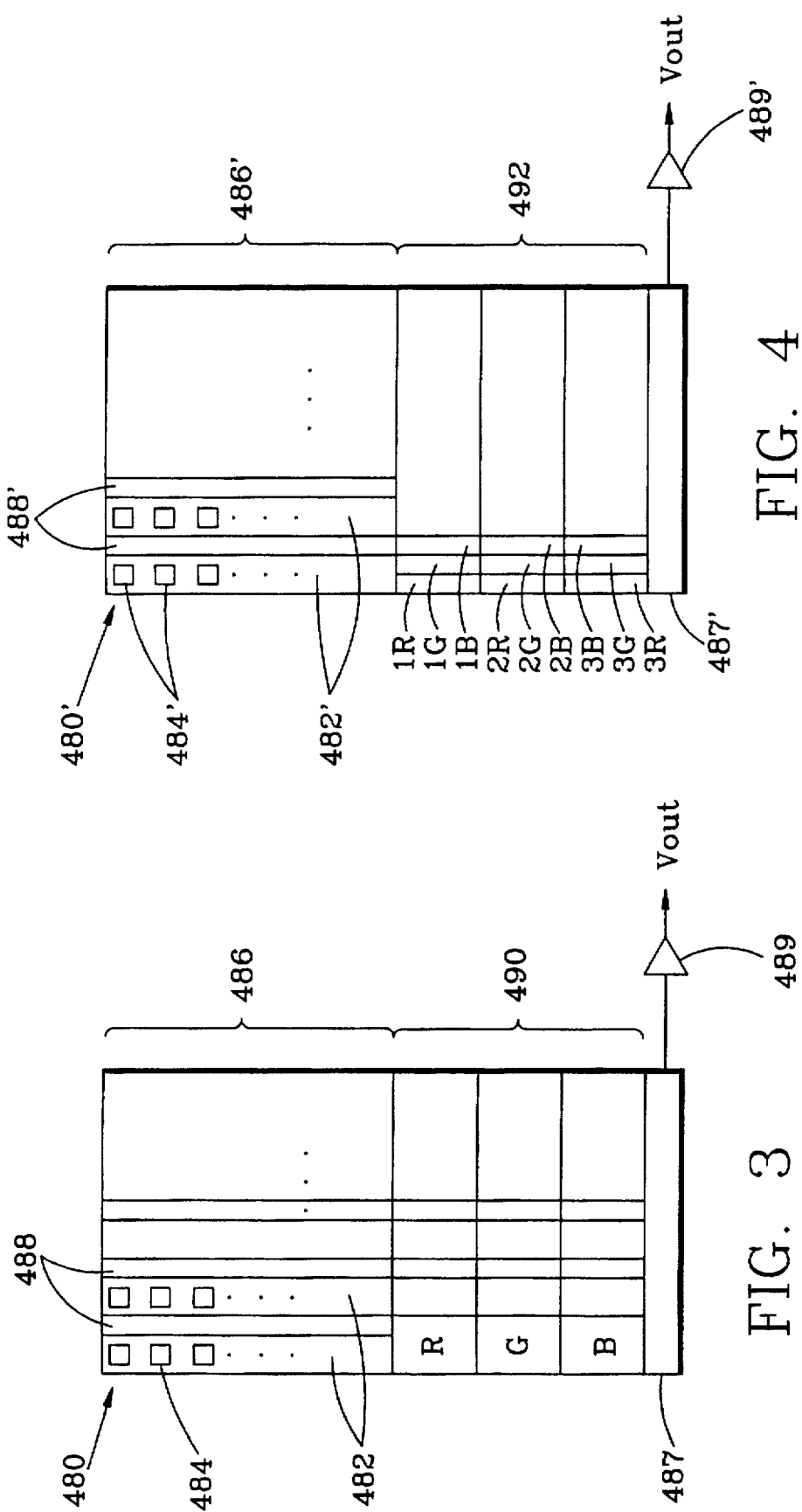

ELECTRONIC IMAGE SENSOR WITH MULTIPLE, SEQUENTIAL OR STAGGERED EXPOSURE CAPABILITY FOR COLOR SNAP SHOT CAMERAS AND OTHER HIGH SPEED APPLICATIONS

RELATED APPLICATIONS

The subject matter of this application is related to that disclosed in commonly-assigned, co-pending U.S. patent application Ser. No. 07/994,875, filed 23 Dec. 1992, and a continuation-in-part thereof Ser. No.08/314,599, filed 28 Sep. 1994.

BACKGROUND OF THE INVENTION

1. Field of the Invention

The present invention relates to electronic image sensors and, more particularly, to such sensors, e.g., of the color snap shot type, that are capable of high speed imaging.

2. Prior Art

Currently in the electronic image sensing art most electronic image sensors are either of an interlaced or non-interlaced type. This means, among other things, that all of the detector population is either 1) reset every $\frac{1}{60}$ to $\frac{1}{30}$ of a second, or 2) reset, one field at a time, every $\frac{1}{60}$ sec with two overlapping integration times. The readout usually occurs during the image acquisition and utilizes all the frame time. Most snap shot type electronic image sensors are of the non-interlaced type, that is, all of the detector population is reset after every exposure and then read out in the dark without light incident on the sensor. To generate a color image of a scene, typically three sensors are utilized to simultaneously image the scene in different colors and then the three image signals detected are read out in parallel, as is the case in broadcast applications. Alternatively, a mosaic color filter can be utilized on the detectors and then chrominance and luminance signals, composed from the electronic output of the image sensor array, can be used to reproduce the image. One other known technique in this regard uses a color filter wheel and reads out one image frame at a time during three consecutive exposures. This last method requires a very long image freeze time, i.e., several seconds, to be able to read out the first color image, e.g., red, before imaging the next frame, e.g., green, and again to read out the green image before imaging the blue frame, so that it is not very practical for any motion scenes and thus for video applications.

In high speed imaging of objects in motion, such as imaging objects from moving platforms like aircraft, or imaging a scene with multiple color bands, it is necessary to rapidly integrate several exposures, e.g., every $\frac{1}{100}$ to $\frac{1}{60}$ sec, and then store the image frames corresponding to these exposures on a chip in preparation for readout or further image processing. Further processing on the chip may involve, for example, time delay and integration, color processing, frame averaging, spatial filtering, etc. Thus, the available area on the chip for these various functions becomes a concern.

3. Prior Art

The sensor devices shown in U.S. Pat. Nos. 4,821,103 to BUSBY and 4,831,453 to TAKEMURA exemplify a prior art approach involving the detection and rapid storage of separate exposures of an image frame, two in this case, and then subsequently reading out the stored exposures to compose the image. In particular, TAKEMURA uses two storage registers at one end for handling the two separate exposures in a video application.

U.S. Pat. No. 4,924,316 to KOBAYASHI pertains to video color imaging wherein the color images are applied to individually color filtered light sensitive detector units and the red (R), green (G), and blue (B) fields are stored separately.

While these prior art approaches have various advantages, they all are directed to video systems, do not take snap shot type detector devices into account, and all have the disadvantage of requiring extra chip real estate for storage.

4. Objects of the Invention

It is an object of the present invention to provide image sensor devices with memory or frame store large enough to store multiple exposures.

It is another object of the present invention to provide such image sensor devices with memory or frame store large enough to store several image frames, acquired from exposures that are generated in a rapid sequence, and to read them out later in sequence after all the exposures are completed.

It is a further object of the invention to provide such image sensor devices capable of snap shot color applications wherein, for example, red, green, and blue color image frames can be rapidly acquired upon the opening of a flash exposure shutter, and very rapidly transferred in parallel into storage registers from which the three frames can be read out when the shutter is closed.

SUMMARY Of THE INVENTION

The present invention is directed to image sensor devices, particularly such devices of the snap shot type, either flash or non-flash, and involves the provision of memory or frame store on the imaging surface, large enough to store charge packets from multiple image frame exposures, along with various constructions for implementing such sensor devices and clocking schemes to drive them. The invention makes it possible to store several image frames, that are generated in a rapid sequence, e.g., during a flash exposure, and to read them out later in sequence after all the frame exposures are completed. Hence, when an image sensor device in accordance with the invention is used in snap shot color applications, red, green, and blue color image frames can be rapidly acquired upon the opening of a shutter, and very rapidly transferred in parallel into storage registers from which the three color frames can be read out as a color image when the shutter is closed. A filter wheel with opaque portions can be used with a frame transfer (FT) embodiment to block the field of view between the sequential color exposures and hence facilitate the parallel readout without color smear. Alternatively, an interline transfer (IT) image register embodiment may be used with light shields covering vertical CCD registers to allow rapid parallel transfer of the acquired images to these storage registers without smearing, obviating the need for the opaque portions on the wheel. In this embodiment each vertical register either has (R, G, B) memory sites interleaved with the detectors in the image register or has a large frame store below the image register.

For a snap shot sensor to be very high in resolution, typically it would be necessary to construct a large analog storage register below the image register, and since the storage register will normally occupy a large physical space, e.g., 50% of that of the image register, the chip size of the sensor would tend to be too large. The invention, in providing a large format sensor, implements the analog charge storage inside the image register in the form of a color separation sensor. The image register has light-shielded or opaque sites every few lines to store, for example, the first two color exposures of a three color snap shot camera. Such an arrangement is adequate for high resolution since one can sample chroma with lower spatial resolution to produce an acceptable color image. The opaque sites can be provided in either frame transfer (FT) or interline transfer (IT) sensor architectures.

BRIEF DESCRIPTION OF THE DRAWINGS

FIG. 1 is a block diagram of an exemplary embodiment of a sensor device in accordance with the present invention.

FIG. 2 is a block diagram of an alternative embodiment of a sensor device in accordance with the invention utilizing a frame transfer (FT) arrangement and a color filter wheel.

FIG. 3 is a block diagram of an another embodiment of a sensor device in accordance with the invention utilizing a vertical interline transfer (IT) arrangement along with a color filter wheel.

FIG. 4 is a block diagram of a further embodiment of a sensor device in accordance with the invention using a vertical field IT (FIT) arrangement and a color liquid crystal shutter or filter wheel.

FIG. 9b shows a super pixel charge sequence in keeping with the charging timing of FIG. 9a.

DETAILED DESCRIPTION OF THE PREFERRED EMBODIMENT

Figure 5C:
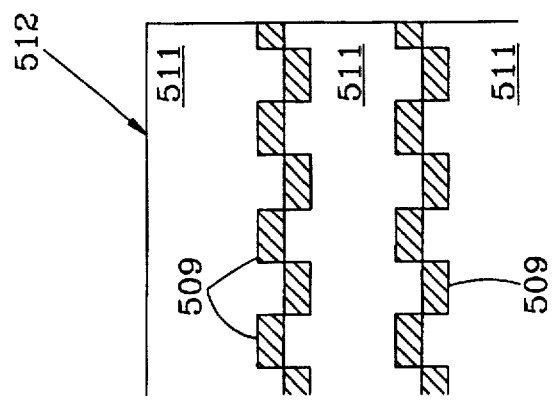
FIGS. 5a–5c are schematic diagrams of embodiments of the invention in which analog charge storage is implemented in different arrangements within the image register of an FT CCD architecture, similar arrangements being possible in the vertical register of an IT CCD architecture

A large format sensor in accordance with the invention is implemented by arranging the analog charge storage inside the image register in the form of a color separation sensor. The image register is provided with light-shielded or opaque sites every few lines to store charge packets produced by image frame exposures, e.g., the first two color exposures of a three color snap shot camera. This arrangement is adequate for high resolution color imaging since chroma can be sampled with lower spatial resolution and produce an acceptable color image, and the chip area need not be much larger than the imaging area, minimizing the required real estate for storage. Also, the last color to be exposed may be selected for sampling to a higher resolution than the previous two.

FIG. 1 is a block diagram illustrating an exemplary embodiment of a sensor device in accordance with the invention. Sensor device 450 includes a photosensitive imaging region or image register 452 that receives light from a colored image, integrates the charge packets produced by a succession of n color exposures, and delivers them, one exposure at a time, to light-shielded memory sites or storage registers 454 which, physically, are dispersed between the light receiving lines of the image register 452. The succession of color exposures can be obtained using the same or different color filters. A transversal filter 456, or alternatively a recursive filter, is then used to process the analog image signals in parallel, generating a pattern recognition flag or other control actions, and the processed signals are read out by a readout section or register 458 to a charge-sense amplifier 459. The filter 456 may be used in doing time delay and integration (TDI) of the images or simply frame averaging.

Alternatively, the transversal filter 456 may be dispensed with and the images can simply be read out in series. Various embodiments not using such a filter are shown in FIGS. 2, 3, and 4, and, in cooperation with a color filter wheel 460, operate to integrate the different color images. The filters 462 in the wheel 460 can be visible, or IR filters for image fusion applications and other non-color image acquisition.

In the embodiment shown in FIG. 2, a frame transfer (FT) organization, arrangement, or architecture is utilized and the filters 462 on wheel 460 are separated by opaque regions to prevent smearing during image frame transfer. More particularly, the alternative exemplary sensor device 470 in FIG. 2 has a configuration in accordance with the invention that allows real time resolution adjustments of the chroma signals in a manner as will now be described. Sensor device 470 may have an image register 472 in the form of a 500×500 array of photosensitive charge-packet-forming regions with every four lines in the image register 472 being followed by a light-shielded mini-storage register 476 (in a manner as shown in detail in FIG. 6). The opaque storage regions making up the storage registers may be formed by permanently depositing metal layers on the sensor surface, or by locating a glass filter, having predesigned opaque areas, in front of the sensor before an image exposure. They may also be formed by depositing an opaque layer or an electrically controlled liquid crystal (X-tal) shutter layer over these lines of the image register.

In operation, by way of example, the device 470 may first be exposed to the blue portion of an image, followed by the green and then the red portions (B,G,R). These three image frames of different colors may be formed during a flash exposure created by the opening and closing of a camera shutter and using a rapidly operating color filter device. Thus, the three color exposures may be done rapidly, e.g., at about 200 μsec intervals. It will be understood, however, that the entire resolution of the image register 472 may not be required for each color, and that different resolutions for the different color exposures may be desirable, so that adjacent rows of charge in each exposure frame are combined at interface 474, between the image register 472 and the storage register 476, as each exposure frame is being transferred into storage register 476. The way in which rows of charge are combined at interface 474 for each of the color exposures will vary depending upon the desired resolution for the particular color. For example, only one-fifth of the image register's resolution may be desired for the blue exposure, so that every five lines of the blue exposure frame will be combined into one at the interface 474 for storage in storage register 476.

If a higher or full resolution is desired for the green exposure, then every two lines may be combined at the interface 474 as the green exposure frame is being downloaded into storage register 476. Finally, the desired resolution for the red exposure might be somewhere in between, with every four lines of charge being combined before storage. Again, the processed signals are read out by a readout section or register 478 to a charge-sense amplifier 479.

In the embodiments shown in FIGS. 3 and 4, a vertical interline transfer (IT) organization or arrangement is used to store the three colors. In the device 480, as shown in FIG. 3, the columns 482 of photosensitive charge-forming elements 484 are alternated in the image register 486 with vertical CCD registers 488 which quickly transfer the charge from the associated columns 482 of charge-forming elements 484 into the storage register 490. The charge packets from successive color exposures may be stored in storage register 490 sequentially as shown in FIG. 3. The processed signals are read out by a readout section or register 487 to a charge-sense amplifier 489.

Alternatively, the charge packets from each individual column over the three color exposures may be stored in parallel adjacent sites such as shown in the device 480' in FIG. 4, that is, the first column of storage register 492 accepts charge packets from the first column of image register 486' and only from the red exposure (designated 1R, 2R, 3R . . . ); the second column of storage register 492 contains charge packets from the first column of image register 486' and only from the green exposure (designated 1G, 2G, 3G . . . ); and so on. This memory storage arrangement of the image charge packets in the storage register 492 in parallel adjacent sites allows for ease of analog signal processing with on-chip filters, e.g. to do multicolor spatial filtering. An advantage of this FIT organization is that the vertical CCD register may be covered by a light shield to prevent image smear in cases where no opaque regions are used between filters on the color wheel. In all cases the vertical transfer of images to the store is done at high speed, i.e., <200–250μsec. In the embodiments of both FIG. 3 and 4, the storage register below the image register may not be required if the vertical registers of the interline sensor are designed with two color, e.g., R and G, storage while the third color, B, is stored in the sense node awaiting its turn in readout. The image register 486' may be reset to a dump drain before integrating the second image, but this is not necessary. The images can be formed by all of the detectors in the array or by sub-sampling of these detectors since, as noted, it is generally not required to have full resolution on chroma signals. The latter technique allows size reduction of the storage register.

Figure 5B:
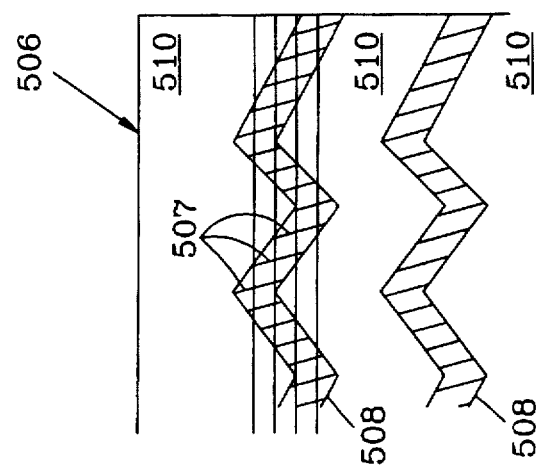
Figure 5A:
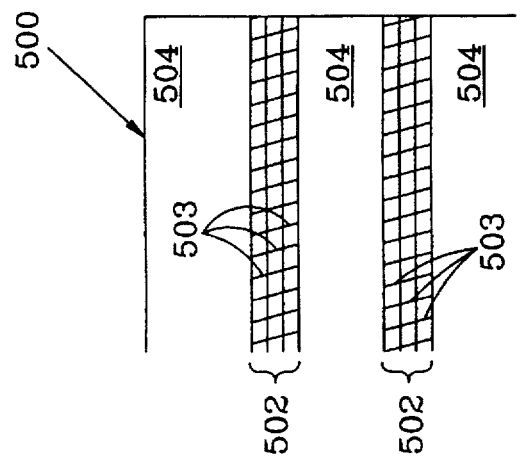

FIGS. 5a–5c are exemplary schematic diagrams of embodiments of the invention in which analog charge storage is implemented within the image register using various storage schemes or arrangements. In these three embodiments, the respective image registers, 500, 506, and 512, receive light from a colored image and integrate the charge packets produced by the succession of n color exposures and deliver them one at a time to light-shielded or opaque memory sites or storage registers, 502, 508, and 509, respectively. FIG. 5a shows an embodiment in which the charge storage is implemented in image register 500 in continuous transversely-arranged storage blocks 502 of storage lines 503 alternating vertically with blocks 504 of imaging lines. Blocks define a group of lines and lines are defined by their gate electrodes. In IT architectures these lines will alternate horizontally with the imaging detectors. FIG. 5b shows an embodiment in which the charge storage is implemented in image register 506 in blocks 508 of discontinuous storage lines 507 alternating with imaging blocks 510. FIG. 5c shows an embodiment in which a staggered storage scheme is employed in image register 512, with storage blocks 509 alternating with imaging blocks 511 in the register lines. The number of opaque storage sites may be equal to or less than the number of imaging sites. Thus, charge binning, i.e., combining several image samples in one storage site, may be performed in the image or storage area before storage. The storage blocks may be contiguous or randomly scattered across the image field to avoid artifacts in the displayed image.

The designs shown in FIGS. 5a to 5c may be used to produce a "3" or an "n" color image. Alternatively, they can be used to produce, for example, three blue images, each taken at a different spatial frequency (charge binning conditions) to better estimate local colors in a region, i.e., to more accurately measure blue in the case of low quantum efficiency such as with a front illuminated CCD.

Figure 6:
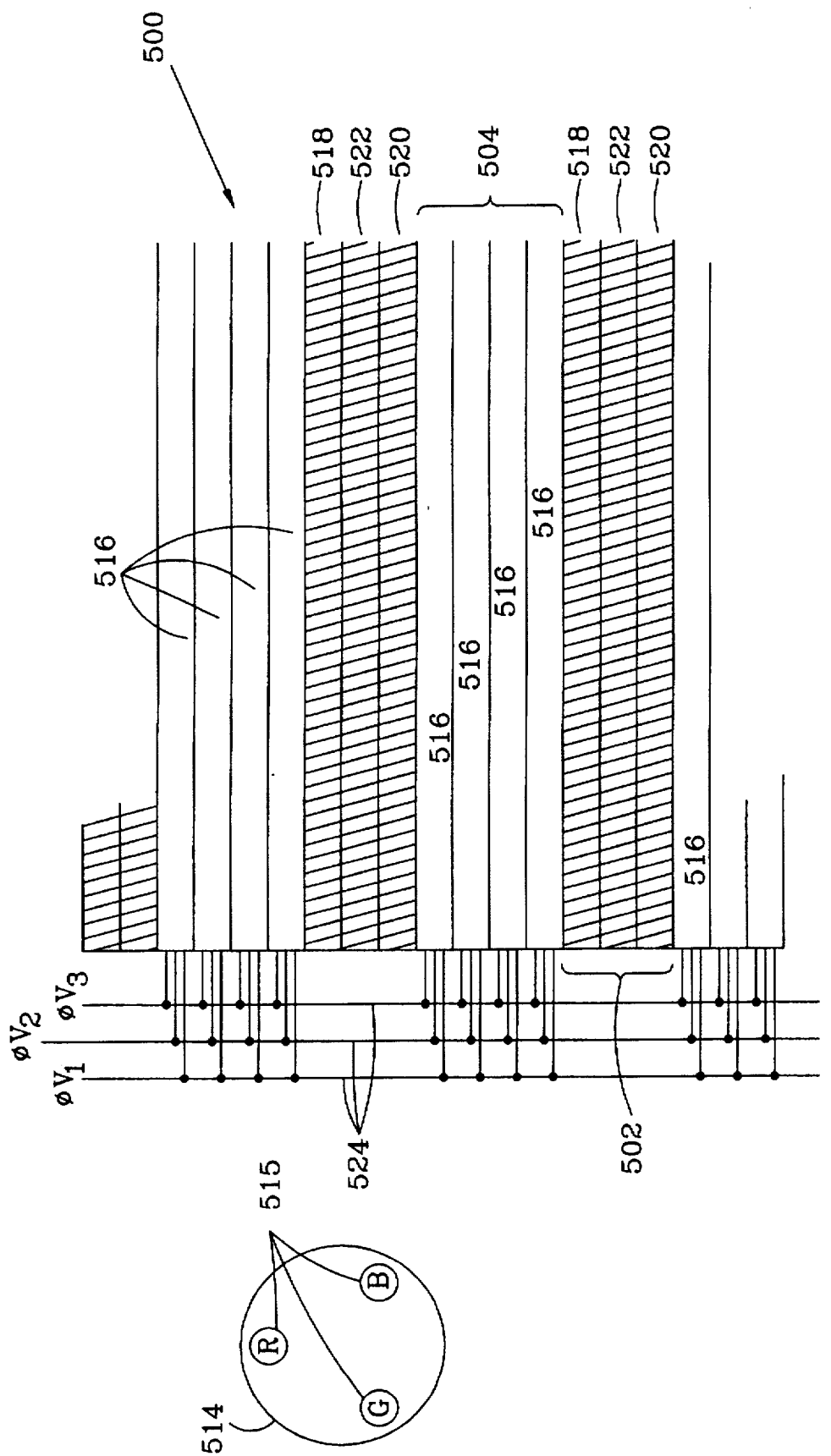
FIG. 6 shows details of the operative structure of the embodiment of the device of FIG. 5a along with a color filter wheel to facilitate the integration of the different color images.

FIG. 6 illustrates in some detail an exemplary construction of the embodiment of the device of FIG. 5a along with a three color filter wheel 514 to facilitate the integration of the different color images. As with the other embodiments using filter wheels, the filters 515 may be a variety of different types, e.g., visible light filters for color imaging, or infrared filters for image fusion applications. In the FIG. 6 embodiment, image register 500 is shown as constructed of imaging blocks 504, each arranged transversely in four lines 516, comprising a plurality of photosensitive charge-packet-forming elements, and separated by two storage register lines 518 and 520 that are separated by an imbedded barrier 522. Each storage register line comprises a plurality of opaque storage elements and the two lines 518, 520, together with the barrier 522 form a block 502 in FIG. 5a. The combination of image subpixels in lines 516 of a block 504 and the memory locations in lines 518–522 may be treated as a super pixel, that is, a region capable of charge manipulation of the image and cross talk charges by charge binning or separation or charge dump using appropriate timing and control pulses, e.g., from a 3-phase ($\phi_{v1}$–$\phi_{v3}$) readout clock, applied to the drive electrodes 524. These super pixels, containing several subpixels and memories for storing color samples and cross talk charge samples, may be co-located with transversal filters that are capable of spatial filtering and time delay and integation and which use separate parallel CCD registers for delay and accumulation.

Figure 7A:
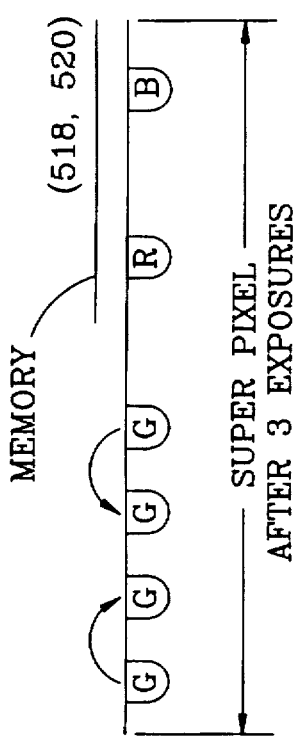
FIG. 7a is an exemplary illustration of the disposition of the charge packets in a super pixel after a red-blue-green (R,B,G) exposure sequence.
Figure 7B:
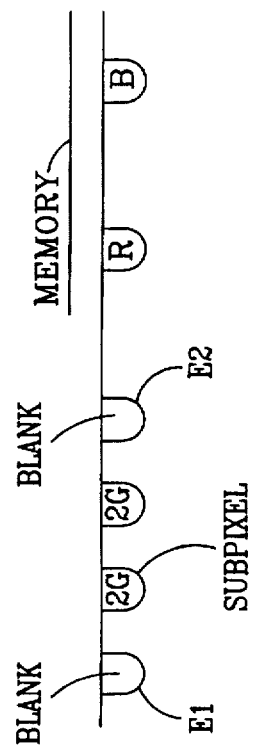
FIG. 7b is an exemplary illustration of the charge packets in the super pixel shown in FIG. 7a during readout.

In one operating embodiment, a red-blue-green color exposure sequence (R,B,G) may be employed to capture an image. After the red exposure, the charge of the four red pixels, i.e., in the charge-packet-forming elements of each group of four lines or rows 516, is added and stored in the opaque storage line 518 which may have an inverted or non-inverted gate, i.e, a buried channel or multi pinned phase (MPP) mode. The same operation is repeated after the blue exposure with the charge accumulated in lines 516 being stored in the corresponding opaque storage elements in storage line 520, but without moving the red charge stored in storage line 518, or just by advancing it one stage to another opaque stage. The green exposure follows with the charge generated therefrom occupying lines 516. FIG. 7a is an exemplary illustration of the disposition of the charge packets in a super pixel after the foregoing exposures, wherein the red and blue charge packets are stored in memory lines 518, 520 and the green charge packets occupy the four lines 516. The charge so collected and stored in the device 500 may then be read out in appropriate sequence. The two storage capacitors and the separation gates normally used with storage lines 518 and 520 can be clocked separately (during charge binning and storage as described above) or in parallel synchronized with 3 phase ($\phi_{V1}-\phi_{V3}$), or 4 phase, readout clocks controlling the imaging elements in lines 516 of the image register. The clocking may be done in non-inverted, inverted, or mixed modes. During readout the four image pixel groups and the storage gates will be used to readout 3 color (filtered) image data. This technique permits the inclusion of blank pixels separating some of the colors and therefore improves the dynamic range on some of the color components. In the foregoing example the last, i.e., the green, exposure will almost have the full resolution of the image sensor. Regarding the blank pixels, FIG. 7b is an exemplary illustration of the charge packets in the super pixel shown in FIG. 7a during readout. Two blank subpixels E1 and E2 are provided, with E1 containing a color cross-talk signal occuring by CTE and E2 receiving red signal spillover if the red charge stored in the adjacent memory is much greater in dynamic range than the charge capacity of the wells during readout.

In the embodiment shown in FIG. 2, wherein a frame transfer (FT) organization is used, the color filters on the wheel are separated by opaque regions to avoid or correct for no smear during image transfer. In the embodiments of FIGS. 3 and 4, however, wherein a vertical interline transfer (IT) organization is used to store the three colors, an advantage of this organization, as noted above, is that the vertical CCD register is covered by a light shield which prevents image smear in cases where no opaque regions are used between filters on the color wheel, and thus no opaque regions need be used between filters.

In all cases the vertical transfer of images to the store is done at high speed, i.e., <250 μsec, with multiple exposures being integrated and stored without downloading the device between exposures. The image register may be reset to a dump drain, e.g., above or below the image register or in a vertical overflow structure to substrate, before integrating the second image, but this is not necessary. The images can be formed by all the detectors or by sub-sampling of these detectors since, as noted, it is generally not required to have full resolution on chroma signals. The sub-sampling technique allows size reduction of the storage register.

Figure 8A:
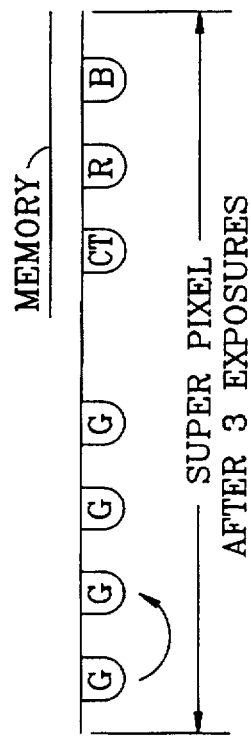
FIG. 8a is an exemplary illustration of the disposition of the charge packets in a super pixel after a red-blue-green (R,B,G) exposure sequence done under high positive bias (buried channel) mode to achieve high charge storage density.
Figure 8B:
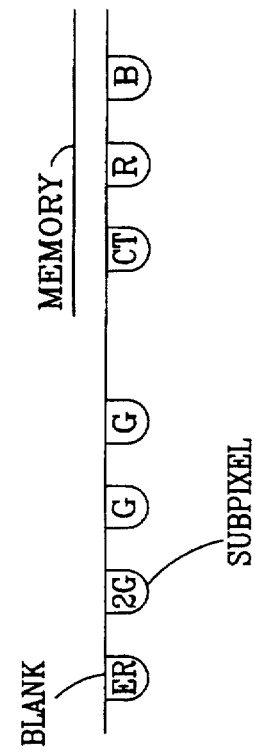
FIG. 8b is an exemplary illustration of the charge packets in the super pixel shown in FIG. 8a during readout.
Figure 9B:
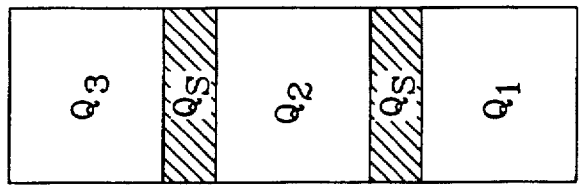
Figure 9A:
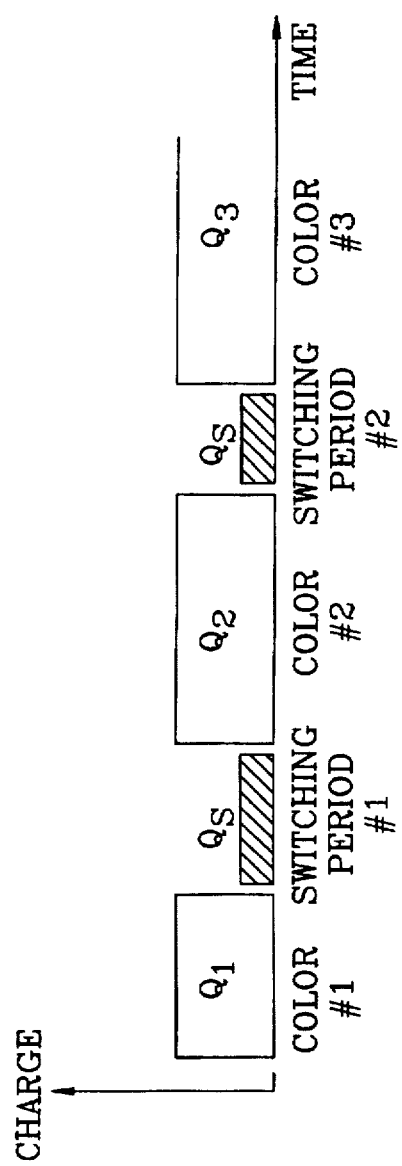
FIG. 9a illustrates a clocking scheme for accumulating color image frame charge packets with a switching time resulting from the operation of a filter wheel or liquid crystal shuttered filter during a flash exposure in a high speed three color snap shot camera in accordance with the invention.

Enhancements to the image acquisition technique of FIG. 6 may be employed to reduce color cross-talk and enhance the dynamic range of the storage for one of the colors. For example, as shown in FIG. 8a, following the red and blue exposure, the charge accumulated in a group of lines 516, due to the green exposure, may be combined into one line such as, e.g., the third line. Also, color cross talk charge CT is formed in the memory during exposure and storage, e.g., during the switching of colors in a liquid crystal shuttered filter while the flash is on. The charge storage in memory (518, 520) during exposure may be done under high positive bias (buried channel) mode to achieve high charge storage density and hence minimize the opaque area or memory region required. Thus, high fill factor is achieved. Readout is done in MPP mode in order to reduce dark current charge in the image. When the charge in device 500 is read out under these circumstances, there is, in effect, a "buffer" row between the rows containing the green information and those containing the red and blue information, as shown in FIG. 8b. This "buffer" row (CT, ET) provides two important advantages. First, due to row CT, cross-talk between the blue and green information is reduced because the rows corresponding to these two different types of information are no longer adjacent. Second, the dynamic range of the device for green information is increased due to the additional storage area provided by the empty row ER adjacent to and behind the green storage line. Thus, any charge from the green exposure which "spills" over into the "buffer" row during readout will not be lost or mixed with charge from the blue exposure. This is particulalrly important when the filter wheel is rotating and the first color is being stored in the opaque region within a single flash time. Hence, clearly the transient period may present some inaccuracy, which is particularly true when liquid crystal shuttered filters are used, since there may be some color and spatial cross talk when switching from the first color to the second. This cross talk charge generated in the cross talk period may be isolated in the buffer stage and either read out separately and ignored, or dumped to a dump drain during the readout, as illustrated in the exemplary timing diagram of FIG. 9a. In FIG. 9a charge packet storage and handling is shown versus filter wheel or liquid crystal shuttered filter switching time in a high speed 3 color snap shot camera. $Q_1$, $Q_2$ and $Q_3$ indicate the amount of charge developed during successive color image frame exposures of a three color image during different exposure periods with intermediate switching periods between them. $Q_s$ represents the color cross talk charge stored in a buffer stage and then dumped or ignored. The charge $Q_s$ between $Q_2$ and $Q_3$ is collected as the liquid crystal shuttered filter switches between color #1 and color #2. Then $Q_s$ is stored in the memory (opaque) region and used to correct colors using software. FIG. 9b illustrates a super pixel charge sequence in keeping with the charging timing of FIG. 9a. It will be understood that variations of this technique may be employed with a variety of exposure sequences to reduce cross-talk and improve dynamic range for charge from any of the exposures in a multiple frame application.

Since scene illumination conditions change and target color contrasts are different, a real time chroma editing feature may be provided wherein several timing, clocking, image sequences may be stored in a color snap shot camera by applying different timing sequences to the sensor of the invention. Accordingly, a photographer or user is given the capability of adjusting the exposure periods and the sampling resolutions of the various colors. The purpose of these adjustments is to allow the best quality color contrast to be obtained in the image produced. The user may experiment with several real time chroma editing programs and decoding algorithms before settling on the optimal exposure conditions. These chroma editing programs and decoding algorithms may be prestored in the camera elecronics and supported by the size of the image to storage regions in the image sensor.

Figure 10:
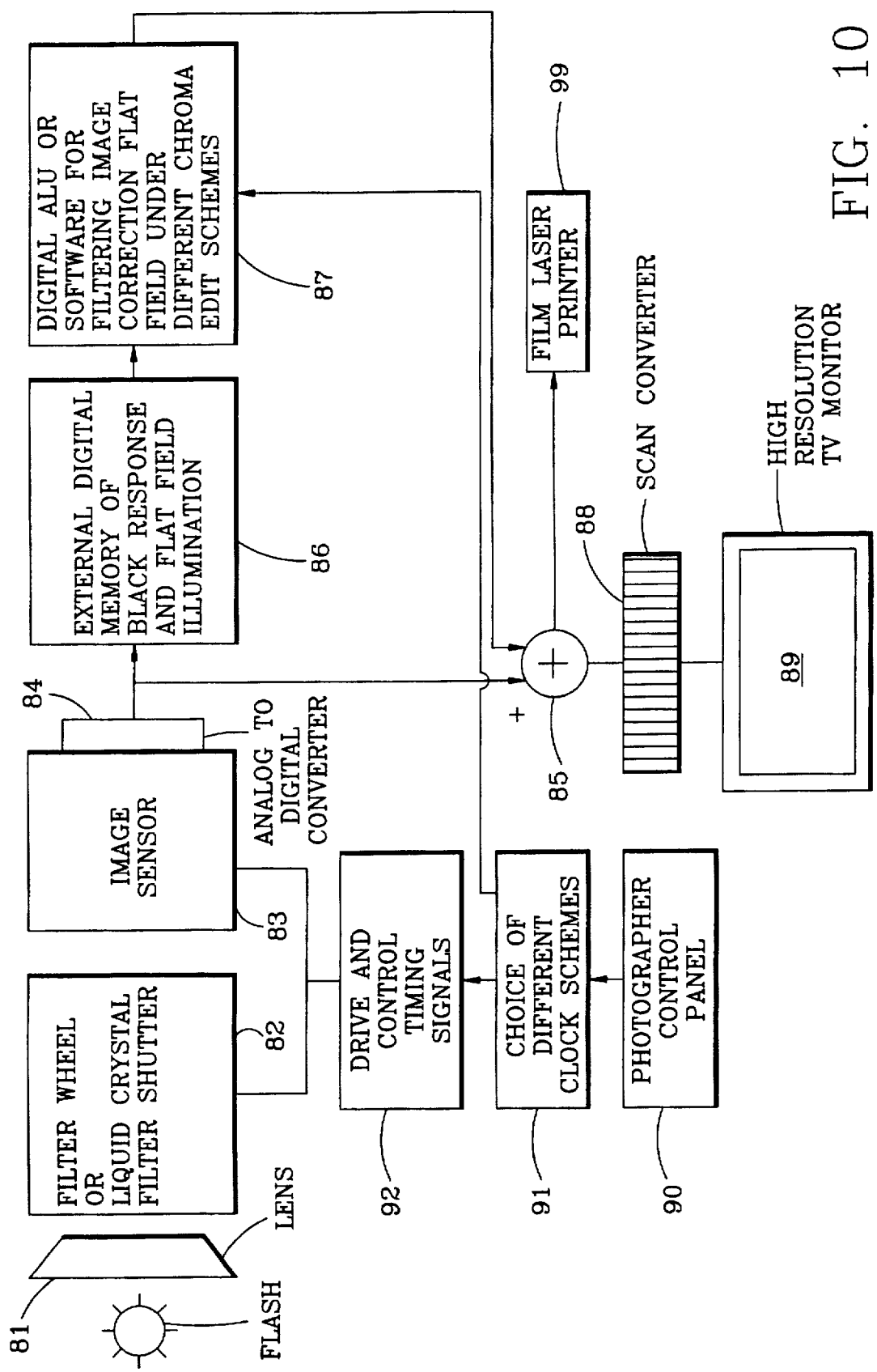
FIG. 10 is a block diagram illustrating one embodiment of a camera incorporating a snap shot imager in accordance with the invention.

A block diagram illustrating one embodiment of a camera incorporating an adjustable snap shot imager for real time chroma editing in accordance with the invention is shown in FIG. 10. As seen in the Figure, a flash exposure of a color image is directed by an imaging lens 81 through a filter wheel, or liquid crystal filter shutter, 82 to an image sensor 83 in accordance with the invention. The output of the sensor 83 is digitized in an analog to digital converter 84 and fed a) directly to one input of an arithmetic logic unit (adder/subtractor) 85 and b) to an external digital memory 86 having a black response and flat field illumination information. The contents of memory 86 are processed in a component 87 in the form of a digital arithmetic logic unit (ALU), or suitable software implementation, for filtering image correction flat field under different chroma editing schemes. The output of component 87 is coupled to the other input of adder/subtractor 85, which controls a scan converter 88 in presenting appropriate images, based on the flash input images, on a high resolution TV monitor 89 or film laser printer 99. To achieve real time chroma editing, a photographer's control panel 90 is provided for operating a control device 91 that chooses different clock schemes, by means of an output to the ALU 87, and selects the desired drive and control timing, by means of signals from an interface device 92 to the timing controls for the filter wheel 82 and the image sensor 83. The electronics will interpolate the pixels in the displayed image over the opaque memory region.

The foregoing embodiments achieve their improved results without mixing charge accumulated from different color exposures in the sensor, thereby avoiding color decoding errors caused by non-linearities, CTE, dark current, quantization and fixed pattern noise. Moreover, because of the smaller area required for the opaque storage regions, the embodiments of FIGS. 4–6 can have high fill factors on the order of 70 to 80% over the full image active area. Also, as mentioned, these embodiments may be clocked in inverted, non-inverted, or mixed modes to enhance storage capacity, improve fill factor, and reduce dark current.

In summary then the important features and advantages of this color sensor architecture are:

1. It provides a color separation sensor that does not mix the colors to avoid color decoding errors caused by non linearities, CTE, dark current, quantization, fixed pattern noise, and color cross talk.
2. It has opaque storage regions among the image regions that are formed by depositing metal layers on the sensor permanently or by locating a glass filter, having predesigned opaque areas, in front of the sensor before an image exposure, or depositing an opaque dielectric or liquid crystal material above the storage under bias control to turn opaque or transparent.
3. It is compatible with large size MPP CCD in order to avoid depositing color filter matrix which will tend to lower the manufacturing yield on large area CCD devices.
4. It is capable of a high fill factor, 70–80%.
5. It can be clocked in the inverted or the non-inverted or a mixed mode.
6. It allows real time resolution adjustments of the chroma signals.
7. It allows for color cross talk correction by separating the color cross talk charge produced during color switching in a separate site.

What is claimed is:

1. An image sensor device of the snap shot type, comprising:

an array of image register means, comprising a plurality of lines of image registers, for receiving the light from image frame exposures and producing charge packets in accordance therewith;

an array of light-shielded storage register means, interspersed in regular displacements among said array of image register means with each storage register means of said array comprising two lines of storage registers interspersed between four lines of image registers, for receiving the transfer of said charge packets from adjacent image register means for storage, said storage register means comprising means for storing multiple image frame exposures; and means for reading out the charge packets stored in said storage register means.

2. An image sensor device as in claim 1 wherein said means for storing multiple image frame exposures comprises means for receiving and storing said exposures in rapid sequence; and wherein said means for reading out the charge packets comprises means for reading out several of said stored exposures in sequence after all the multiple image frame exposures are completed.

3. An image sensor device as in claim 2 wherein said means for storing multiple image frame exposures has inverted, non-inverted, and mixed modes, and further comprising means for clocking said means for storing multiple image frame exposures in one of the inverted, the non-inverted, or the mixed mode.

4. An image sensor device as in claim 1 wherein said plurality of lines of image registers have blank lines interspersed therein.

5. An image sensor device as in claim 1 wherein said lines of storage registers are separated by imbedded barrier lines.

6. An image sensor device as in claim 1 wherein said arrays of storage register means comprise continuous lines of storage blocks interspersed between said plurality of lines of image registers.

7. An image sensor device as in claim 1 wherein said arrays of image register means comprise discontinuous lines of image blocks and said arrays of storage register means comprise discontinuous lines of storage blocks interspersed between said discontinous lines of image blocks.

8. An image sensor device as in claim 1 wherein said arrays of image register means comprise staggered lines of image blocks and said arrays of storage register means comprise staggered lines of storage blocks alternating with each line of said image blocks.

9. An image sensor device as in claim 1 wherein said arrays of image register means and arrays of storage register means are disposed in a vertical interline transfer (IT) arrangement.

10. An image sensor device as in claim 9 further comprising color filter means for producing said multiple image frame exposures.

11. A method for producing images using an image sensor of the snap shot type, comprising the steps of:

disposing an array of image registers, comprising a plurality of lines of image registers, for receiving the light from image frame exposures and producing charge packets in accordance therewith;

disposing an array of light-shielded storage registers, comprising a plurality of lines of storage registers interspersed in regular displacements among said array of image registers, with two lines of storage registers interspersed between four lines of said image registers, and transferring said charge packets from adjacent image registers for storage in said storage registers during multiple image frame exposures; and reading out the charge packets stored in said storage registers.

12. A method as in claim 11 wherein the producing and transferring of charge packets is done for multiple image frame exposures in rapid sequence; and the reading out of the charge packets is done in sequence after all the multiple image frame exposures are completed.

13. A method as in claim 11 wherein a three color image is obtained by the steps comprising:

opening a shutter to produce a flash exposure of a color image;

rapidly acquiring said color image by receiving first, second, and third color image frames sequentially in said array of image registers to produce charge packets respectively indicative of said first, second, and third color image frames, and rapidly transferring the charge packets indicative of said image frames sequentially into said adjacent storage registers from said array of image registers;

closing said shutter; and, then reading out the charge packets stored in said adjacent storage registers to a charge sense amplifier to obtain the three color image.

14. A method as in claim 11 wherein said storage registers have inverted, non-inverted, and mixed modes, and wherein said steps are clocked in either the inverted, the non-inverted, or the mixed mode.

15. Apparatus for producing images using an image sensor of the snap shot type, comprising:

shutter means for producing a flash exposure of a color image;

color filter means for producing multiple color image frame exposures from said flash exposure;

image sensor means for sensing said multiple color image frame exposures, comprising:

an array of image register means for receiving said multiple color image frame exposures and producing charge packets in accordance therewith;

an array of light-shielded storage register means interspersed in regular displacements among said array of image register means for receiving the transfer of said charge packets from adjacent image register means for storage, said storage register means comprising means for storing multiple color image frame exposures; and means for reading out the charge packets stored in said storage register means and producing image signals indicative thereof;

editing means responsive to said image signals for applying different chroma editing schemes thereto and producing editing signals in accordance therewith;

ALU means for receiving said image signals and said editing signals and producing an output based thereon for use in displaying a video image indicative of said color image; and control means, coupled to said color filter means and said image sensor means, for outputting control signals to control the timing of the producing and sensing of said multiple color image frame exposures, and coupled to said editing means for outputting selecting signals to select the chroma editing scheme from among the different editing schemes to be applied to said image signals.

16. Apparatus as in claim 15 wherein said arrays of image register means and arrays of storage register means are disposed in a vertical interline transfer (IT) arrangement.

17. Apparatus as in claim 15 wherein said editing means comprises an ALU.

18. Apparatus as in claim 15 wherein said image sensor means further comprises analog to digital converter means for converting said charge packets to digital image signals.

19. Apparatus as in claim 15 further comprising scan converter means for converting said output of said ALU means for use in displaying the video image.

* * * * *